United States Patent
You et al.

(10) Patent No.: US 12,425,210 B2
(45) Date of Patent: Sep. 23, 2025

(54) SWITCHING PROCESSING METHOD, TERMINAL DEVICE AND STORAGE MEDIUM

(71) Applicant: GUANGDONG OPPO MOBILE TELECOMMUNICATIONS CORP., LTD., Guangdong (CN)

(72) Inventors: Xin You, Dongguan (CN); Haitao Li, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 316 days.

(21) Appl. No.: 17/882,710

(22) Filed: Aug. 8, 2022

(65) Prior Publication Data

US 2022/0386192 A1    Dec. 1, 2022

Related U.S. Application Data

(63) Continuation of application No. PCT/CN2020/075020, filed on Feb. 13, 2020.

(51) Int. Cl.
  *H04L 9/08* (2006.01)
  *H04W 36/00* (2009.01)
  (Continued)

(52) U.S. Cl.
  CPC ....... *H04L 9/0894* (2013.01); *H04W 36/0079* (2018.08); *H04W 36/185* (2023.05); *H04W 36/083* (2023.05)

(58) Field of Classification Search
  CPC .......... H04W 36/0079; H04W 36/185; H04W 36/083; H04W 12/04; H04W 74/0833;
  (Continued)

(56) References Cited

U.S. PATENT DOCUMENTS

2018/0132158 A1* 5/2018 Tseng .................. H04W 76/27
2018/0279193 A1   9/2018 Park
  (Continued)

FOREIGN PATENT DOCUMENTS

| CN | 109246770 A | 1/2019 |
| CN | 110622558 A | 12/2019 |
| WO | 2017138978 A1 | 8/2017 |

OTHER PUBLICATIONS

3GPP TSG-RAN WG2 Meeting #107bis Chongqing, China, Oct. 14-18, 2019 (R2-1913995) (Year: 2019).*
  (Continued)

*Primary Examiner* — Sun Jong Kim
(74) *Attorney, Agent, or Firm* — PERKINS COIE LLP

(57) ABSTRACT

Disclosed are a switching processing method, a terminal device and a computer-readable storage medium. The method comprises: when a terminal device successfully randomly accesses a target network device in the process of executing a first type of switching, the terminal device switches uplink data transmission to the target network device, and when a preset condition is met, the terminal device executes one of the following processings: releasing the connection with a source network device; not triggering the re-establishment of the connection with the source network device; and not triggering a random access process with the source network device.

18 Claims, 9 Drawing Sheets

(51) Int. Cl.
*H04W 36/08* (2009.01)
*H04W 36/18* (2009.01)

(58) Field of Classification Search
CPC ............. H04W 76/18; H04W 74/0836; H04W 74/0838; H04L 9/0894
See application file for complete search history.

(56) References Cited

U.S. PATENT DOCUMENTS

| | | | |
|---|---|---|---|
| 2020/0022035 | A1 | 1/2020 | Kadiri et al. |
| 2020/0022039 | A1* | 1/2020 | Kadiri .................. H04W 76/30 |
| 2020/0374773 | A1* | 11/2020 | Zhang ................ H04W 36/305 |
| 2021/0120505 | A1* | 4/2021 | Awoniyi-Oteri .... H04W 52/146 |
| 2021/0345213 | A1* | 11/2021 | Kim .................. H04W 36/0058 |

OTHER PUBLICATIONS

First Office Action of the Chinese application No. 202211400276.X, issued on May 11, 2024, 16 pages with English translation.
Second Office Action of the European application No. 20918350.8, issued on Dec. 8, 2023. 5 pages.
First Office Action of the Japanese application No. 2022-548495, issued on Nov. 7, 2023. 6 pages with English translation.
Notice of Allowance of the Japanese application No. 2022-548495, issued on Jan. 16, 2024. 5 pages with English translation.
Intel Corporation: "Running CR for the introduction of NR mobility enhancement" R2-1913995; 3GPP TSG RAN WG2 Meeting #107bis; Chongqing, China; Oct. 14-18, 2019. 24 pages.
Supplementary European Search Report in the European application No. 20918350.8, mailed on Dec. 1, 2022. 10 pages.
"3rd Generation Partnership Project; Technical Specification Group Radio Access Network; NR; NR and NG-RAN Overall Description; Stage 2 (Release 16)", 3GPP Standard; Technical Specification; 3GPP TS38.300, V16.0.0, Jan. 8, 2020 (Jan. 8, 2020), pp. 1-101, XP051860596. 101 pages.
First Office Action of the European application No. 20918350.8, issued on Aug. 10, 2023. 6 pages.
First Office Action of the Canadian application No. 3167804, issued on Sep. 18, 2023. 4 pages.
VIVO. "Summary of Email Discussion on CP for DAPS", R2-1912349, 3GPP TSG-RAN WG2 Meeting #107bis, Chongqing, China, Oct. 14-18, 2019, Oct. 4, 2019 (Oct. 4, 2019), section 2.
CATT. "Remaining CP Issues of DAPS", R2-1914485, 3GPP TSG RAN WG2 Meeting #108, Reno, NV, USA, Nov. 18-22, 2019, Nov. 8, 2019 (Nov. 8, 2019), entire document.
International Search Report in the international application No. PCT/CN2020/075020, mailed on Nov. 3, 2020.
Written Opinion of the International Search Authority in the international application No. PCT/CN2020/075020, mailed on Nov. 3, 2020.
Huawei, HiSilicon, China Telecom, "Considerations on control plane for DAPS", 3GPP TSG-RAN WG2 #107bis R2-1913205, Chongqing, China, Oct. 14-18, 2019.
ZTE Corporation, Sanechips, "Remaining aspects of control plane handling in DAPS", 3GPP TSG-RAN WG2 Meeting #108 R2-1914818, Reno, USA, Nov. 18-22, 2019.
First Office Action of the Vietnamese application No. 1-2022-05696, issued on Sep. 5, 2024, 4 pages with English translation.
First Office Action of the Korean application No. 10-2022-7027928, issued on Jul. 8, 2025, 12 pages with English translation.

* cited by examiner

In a process that a terminal device performs a first type of handover, in response to that a random access between the terminal device and a target network device is successful, the terminal device hands over uplink data transmission to the target network device, and in a case that a preset condition is satisfied, the terminal device performs one of following processes: releasing a connection with a source network device; not triggering a re-establishment of a connection with the source network device; or not triggering a random access procedure with the source network device

FIG. 2

Communication unit 61

FIG. 6

SWITCHING PROCESSING METHOD, TERMINAL DEVICE AND STORAGE MEDIUM

CROSS-REFERENCE TO RELATED APPLICATION

The present application is a continuation of International Application No. PCT/CN2020/075020 filed on Feb. 13, 2020, the disclosure of which is hereby incorporated by reference in its entirety.

BACKGROUND

In related art, in a handover process in which both a source network device and a target network device are connected, a terminal device will maintain both a protocol stack of a source cell and a protocol stack of a target cell during the handover. However, in such a processing manner, the terminal device may trigger some useless processing procedure, thereby bringing additional interruption time and processing complexity.

SUMMARY

The present disclosure relates to the field of information processing technologies, and in particular, to a method for processing handover, a terminal device and a computer-readable storage medium.

To solve the above technical problems, embodiments of the present disclose provide a method for processing handover, a terminal device and a computer-readable storage medium.

In a first aspect, a method for processing handover is provided. The method includes following operations.

In a process that a terminal device performs a first type of handover, in response to that a random access between the terminal device and a target network device is successful, the terminal device hands over uplink data transmission to the target network device and performs one of following processes in a case that a preset condition is met: releasing a connection with a source network device; not triggering a re-establishment of a connection with the source network device; or not triggering a random access procedure with the source network device.

In a second aspect, a terminal device is provided. The terminal device includes a processor and a memory. The memory is configured to store computer programs, and the processor is configured to call and run the computer programs stored in the memory to perform the methods in the above first aspect or various implementation manners thereof.

In a third aspect, a computer-readable storage medium for storing computer programs is provided. The computer programs cause a processor of a terminal device to perform the methods in the above first aspect or various implementation manners thereof.

BRIEF DESCRIPTION OF THE DRAWINGS

FIG. 2 is a schematic flowchart of a method for processing handover provided by the embodiments of the present disclosure.

FIG. 6 is a schematic structural diagram of a terminal device provided by the embodiments of the present disclosure.

DETAILED DESCRIPTION

In order to understand the features and technical contents of the embodiments of the present disclosure in more detail, the implementation of the embodiments of the present disclosure will be described in detail below with reference to the accompanying drawings. The accompanying drawings are for reference only and are not intended to define embodiments of the present disclosure.

The technical solutions in the embodiments of the present disclosure will be described below with reference to the accompanying drawings in the embodiments of the present disclosure. Obviously, the described embodiments are part of the embodiments of the present disclosure, not all of the embodiments. Based on the embodiments in the present disclosure, all other embodiments obtained by those of ordinary skill in the art without creative efforts shall fall within the protection scope of the present disclosure.

The technical solutions of the embodiments of the present disclosure can be applied to various communication systems, for example, a Global System of Mobile communication (GSM) system, a Code Division Multiple Access (CDMA) system, a Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or 5G system, etc.

Figure 1:
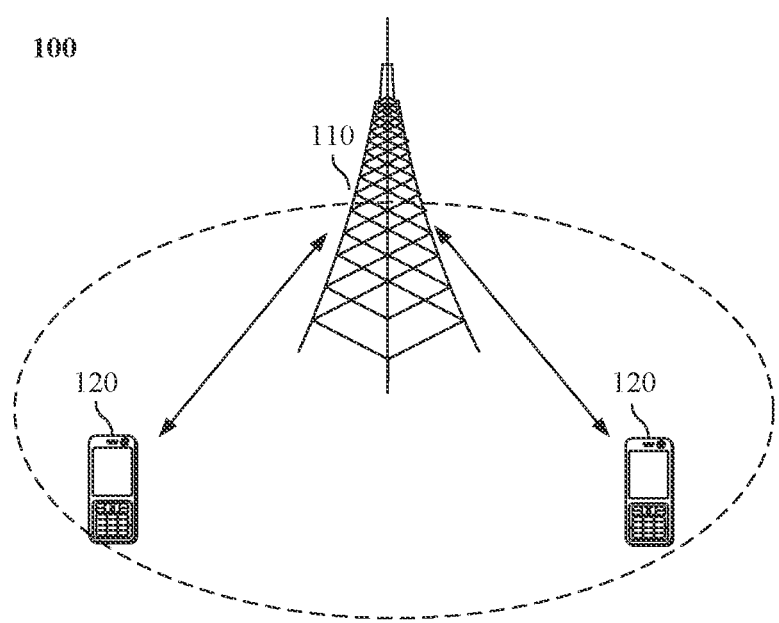
FIG. 1 is a first schematic diagram of a communication system architecture provided by the embodiments of the present disclosure.

Exemplarily, a communication system 100 to which the embodiments of the present disclosure is applied may be as shown in FIG. 1. The communication system 100 may include a network device 110, and the network device 110 may be a device that communicates with the UE 120 (or referred to as a communication terminal, a terminal). The network device 110 may provide communication coverage for a particular geographic area and may communicate with UEs located within the coverage area. Optionally, the network device 110 may be a network device in a GSM system or a CDMA system (Base Transceiver Station, BTS), or a network device in a WCDMA system (NodeB, NB), or an evolutional network device in an LTE system (Evolutional Node B, eNB or eNodeB), or a wireless controller in a Cloud Radio Access Network (CRAN), or the network device may be a mobile switching center, relay station, access point, Vehicle-mounted devices, wearable devices, hubs, switches, bridges, routers, a network-side device in the 5G network, or a network device in the future evolved Public Land Mobile Network (PLMN), etc.

The communication system 100 also includes at least one terminal 120 located within the coverage area of the network device 110. The "terminal" used herein includes, but is not limited to, the devices connected via a wired line, such as Public Switched Telephone networks (PSTN), Digital Subscriber Line (DSL), digital cable and direct cable, and/or via another data connection/network, and/or via a wireless interface, such as a cellular network, a Wireless Local Area Network (WLAN), a digital television network such as a DVB-H network, a satellite network, and an AM-FM broadcast transmitter, and/or a device of another terminal configured to receive/transmit a communication signal, and/or an Internet of Things (IOT) device. A terminal configured to communicate through a wireless interface may be referred to as a "wireless communication terminal". "wireless terminal" or "mobile terminal".

Optionally, Device to Device (D2D) communication may be performed between UEs 120.

It should be understood that the terms "system" and "network" are often used interchangeably herein. The term "and/or" in the present disclosure is only an association relationship to describe the associated objects, and represents that there can be three kinds of relationships, for example, A and/or B can represents three kinds of cases, i.e., A exists alone, both A and B exist, and B exists alone. In addition, the character "/" in the present disclosure generally represents that there is an "or" relationship between the associated objects before and after.

In order to understand the features and technical contents of the embodiments of the present disclosure in more detail, the implementation of the embodiments of the present disclosure will be described in detail below with reference to the accompanying drawings. The accompanying drawings are for reference only and are not intended to define embodiments of the present disclosure.

Embodiments of the present disclosure provide a method for processing handover. As shown in FIG. 2, the method includes the following operations.

In operation 21, in a process that a terminal device performs a first type of handover, in response to that a random access between the terminal device and a target network device is successful, the terminal device hands over uplink data transmission to the target network device, and in a case that a preset condition is met, the terminal device performs one of following processes: releasing a connection with a source network device; not triggering a re-establishment of a connection with the source network device; or not triggering a random access procedure with the source network device.

The first type of handover is: a handover during which the terminal device maintains a protocol stack of the source network device and a protocol stack of the target network device. The first type of handover may be referred to as a dual active protocol stack (DAPS) handover (HO).

In the embodiments, a network device may be a base station on a network side. The source network device may be a source base station connected to the terminal device, and the target network device may be a target base station. The terminal device is a device that can maintain both a connection with the source network device and a connection with the target network device during handover.

Figure 3:
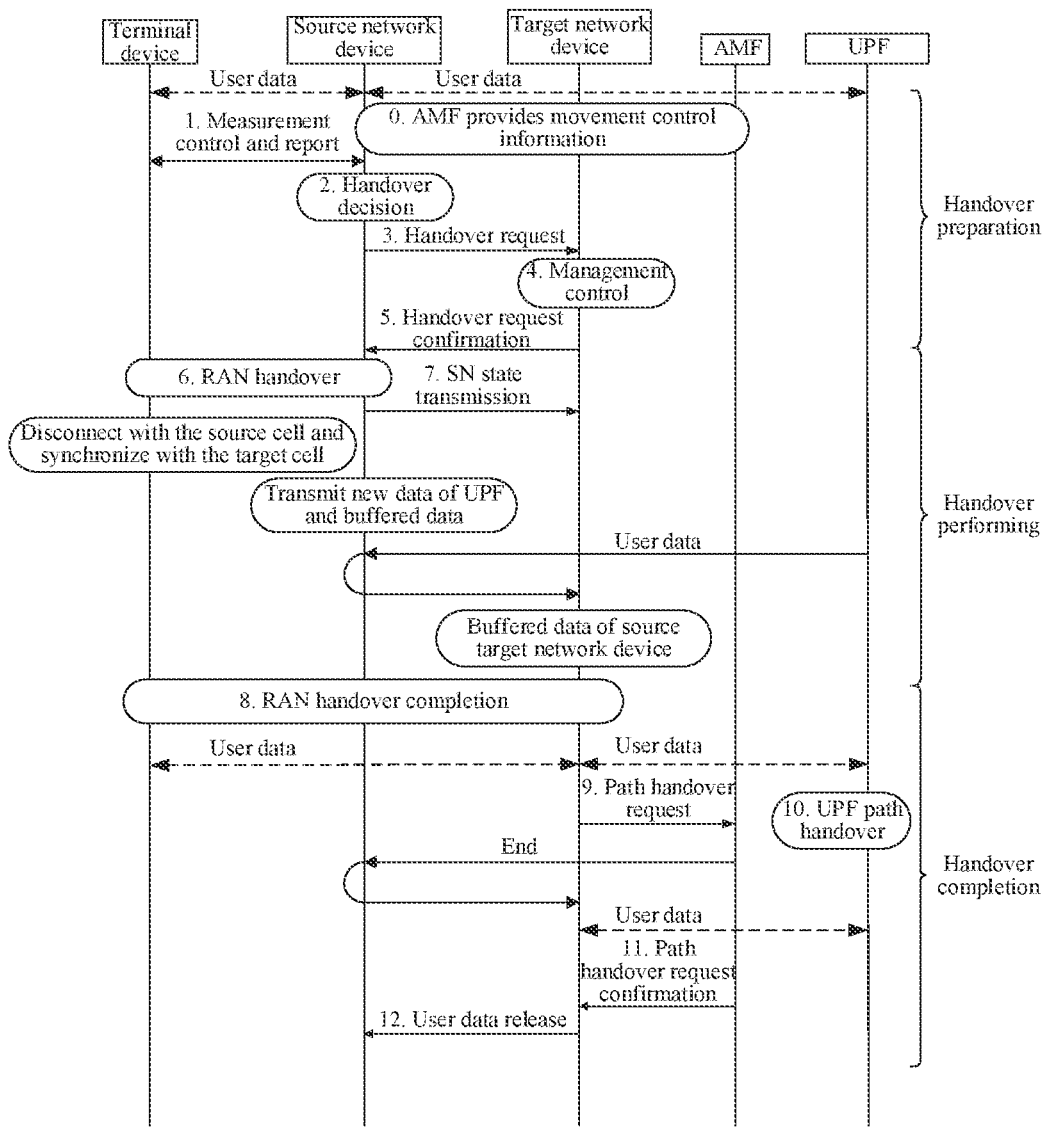
FIG. 3 is a schematic flowchart of a handover.

First, a scenario of the embodiments will be described. Similar to a LTE system, a New Radio (NR) system supports a handover process of the terminal device in a connected state. When the terminal device that is using a network service moves from one cell to another, or in a case of wireless transmission traffic loads adjustment, maintenance of activation operation, device failure, etc, in order to ensure continuity of communication and quality of service, the system needs to transfer a communication link of the terminal device from an original cell to a new cell, i.e., to perform the handover process. Taking a handover process corresponding to a Xn interface handover process as an example for illustration, the entire handover process includes following three stages. As shown in FIG. 3, the handover process includes a handover preparation stage, handover performing stage, and handover completion stage.

In the handover preparation stage, as shown in 0-5 of the figure, a target network device and a source network device perform processes according to mobility control information provided by an Access and Mobility Management Function (AMF) entity. A terminal device performs measurement control and report, the source network device performs a handover decision, and then the source network device sends a handover request to the target network device, the target network device performs management control, and handover request confirmation. The handover confirmation message includes a handover command generated by the target cell, and the source network device is not allowed to modify the handover command generated by the target network device, and directly forwards the handover command to the terminal device.

In the handover performing stage, as shown in 6-7 of the figure, the terminal device immediately performs a handover procedure after receiving the handover command, the handover procedure may include the following operations: a Radio Access Network (RAN) handover is performed between the terminal device and the source network device, the terminal device disconnects with the source cell, synchronizes with the target cell and establishes a connection (such as performing random access, sending an RRC handover completion message to the target base station, etc.), and performs a SN state transition; and the handover procedure may also include that the source network device transmits new data of a User Plane Function (UPF) entity, and transmits buffered data to the target network device.

In the handover completion stage, as shown in 8-12 of the figure, after the RAN handover is completed, user data is transmitted between the terminal device and the target network device, and the user data is transmitted between the target network device and the UPF, then the target network device sends a path handover request to AMF, UPF performs path handover, and then AMF notifies the target network device of the end of the path handover through the source network device, AMF sends a path handover request confirmation to the target network device, and then the target network device notifies the source network device to perform release of user data.

In addition, another handover scenario corresponding to the embodiments may also include the following two architectures, i.e. a handover based on dual-connection and a handover during which connections with both the source network device and the target network device are maintained.

In a case of the handover based on dual-connection, during handover, the target network device is first added as a secondary node (SN), and then the SN is changed into a master node (MN) through role conversion signaling, and finally the source network device is released, so as to achieve an effect of reducing an interruption time when handing over.

Another architecture is the handover during which the connections with both the source network device and the target network device are maintained, which may be understood as a handover of Enhanced make-before-break (eMBB). The difference is that when the terminal device receives the handover command (HO command), it initiates random access to the target network device while maintaining the connection with the source network device continuously, and the connection with the source network device is released until the terminal device accesses to the target network device completely.

Further, in a 3GPP mobility enhancement topic (including LTE and NR), a dual active protocol stack (DAPS) optimization method for reducing interruption time when handing over is proposed. The key point is that the terminal device will maintain both a protocol stack of the source network device and a protocol stack of the target network device during the handover. After receiving the DAPS handover command, the terminal device maintains the connection with the source network device and initiates a synchronization process to the target network device. When the synchronization process/random access is completed, the terminal device will perform handover of the uplink data, that is to say, the uplink data transmission for the network device will be handed over from the source network device side to the target network device side after the random access. After the random access, the release of the protocol stack of the source network device is based on an explicit indication from the network, that is to say, during the period after random access until the release of the connection with the source network device, the terminal device can normally receive downlink data sent by the source cell, and can send uplink feedback information related to the downlink data and the like to the source cell.

Figure 4:
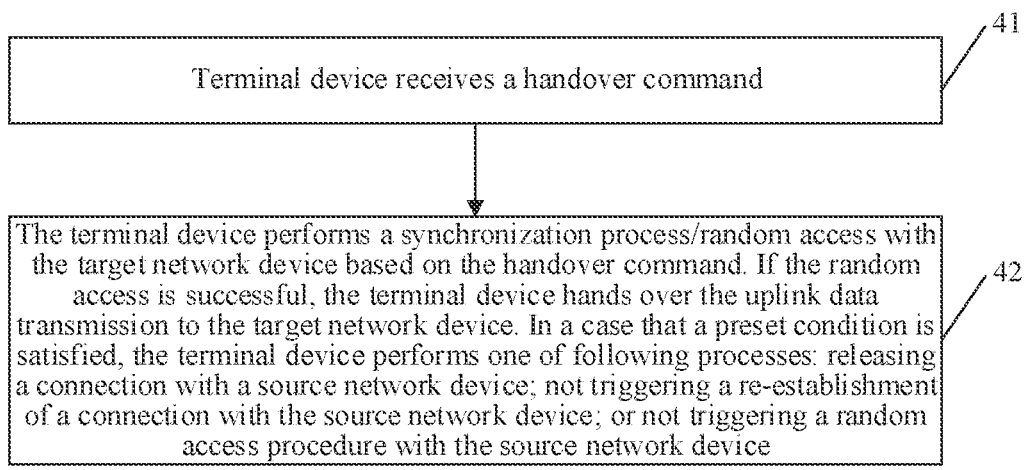
FIG. 4 is a first schematic flowchart in an example provided by the embodiments of the present disclosure.

In the procedure that the terminal device performs the first type of handover (DAPS handover), in a case that the random access between the terminal device and the target network device is successful, while the terminal device hands over the uplink data transmission to the target network device, the terminal device also retains the protocol stack of the source network device, or it is understood that the terminal device retains the connection with the source network device. In such a scenario, how to avoid triggering a useless connection procedure, and additional transmission interruption time and additional complexity brought by the useless connection procedure to the terminal device is the problem to be solved by the solution provided in the embodiments. As shown in FIG. 4, the solution provided by the embodiments may include the following operations.

In operation 41, the terminal device receives a handover command, and the handover command instructs the terminal device to perform the first type of handover, that is, DAPS handover.

In operation 42, the terminal device performs a synchronization process/random access with the target network device based on the handover command. If the random access is successful, the terminal device hands over the uplink data transmission to the target network device. In a case that a preset condition is met, the terminal device performs one of following processes; releasing a connection with a source network device; not triggering a re-establishment of a connection with the source network device; and not triggering a random access procedure with the source network device.

Based on the above, the solution is illustrated with examples.

A First Example

The preset condition includes that a Radio Link Failure (RLF) occurs in a connection between the terminal device and the source network device.

In a case that the preset condition is met, a process performed by the terminal device is: releasing the connection with the source network device; or not triggering the re-establishment of the connection with the source network device.

For One Case:

In a case that an RLF occurs in a connection between the terminal device and the source network device (or the source cell), the terminal device releases the connection with the source cell.

The process of releasing the connection with the source network device may include: releasing a protocol stack of the source network device and releasing a secret key associated with the source network device.

That is, if a trigger condition about a RLF is met between the terminal device and the source network device, when it is determined that an RLF occurs, the re-establishment of the connection with the source network device according to the regulation of existing protocol is not performed, but the connection with the source network device is released.

In other words, once an RLF occurs in a connection between the terminal device and the source network device, the connection with the source network device is completely avoided by releasing the connection with the source network device, which includes the protocol stack corresponding to the source network device and other related information, so that re-establishment of connection is also not performed.

Figure 5:
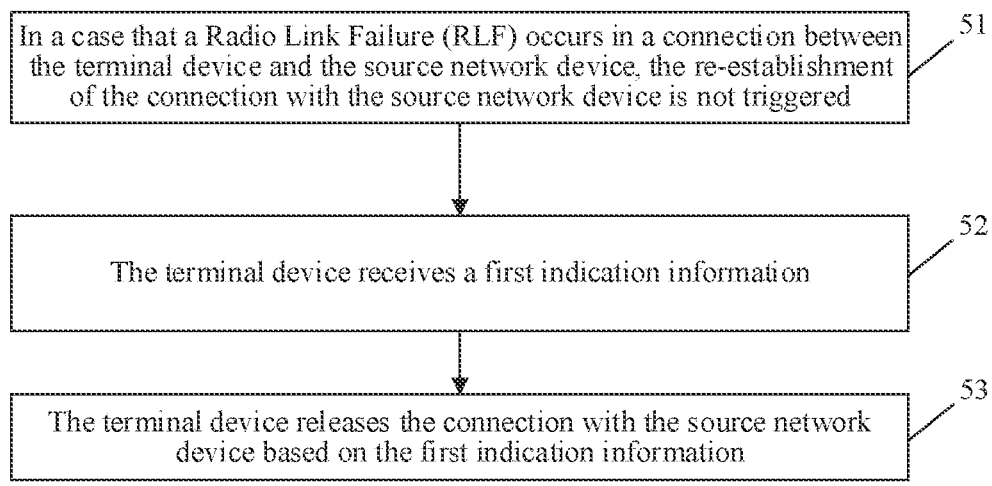
FIG. 5 is a second schematic flowchart in an example provided by the embodiments of the present disclosure.

For Another Case as Shown in FIG. 5:

In operation 51, in the case that the RLF occurs in the connection between the terminal device and the source network device, the re-establishment of the connection with the source network device is not triggered.

That is, if a trigger condition about the RLF is met between the terminal device and the source network device, when it is determined that RLF occurs, the re-establishment of the connection with the source network device according to the regulation of existing protocol is not performed, but the terminal device is controlled not to perform the processing of re-establishment of connection with source network devices.

This operation may further include: if the process performed by the terminal device is not triggering the re-establishment of the connection with the source network device, the terminal device retains a protocol stack of the source network device. The difference from the previous example is that in this case of this example, the terminal device is only controlled not to perform the re-establishment of the connection, but retains the protocol stack of the source network device, or it is understood as that the terminal device retains information related to the source network device.

On this basis, in operation 52, the terminal device receives first indication information, the first indication information is used to instruct release of the connection with the source network device.

In operation 53, the terminal device releases the connection with the source network device based on the first indication information. The process of releasing the connection with the source network device includes: releasing a protocol stack of the source network device and releasing a secret key associated with the source network device.

That is to say, if the RLF occurs in the connection between the terminal device and the source network device, the terminal device does not trigger the re-establishment of connection, and retains the protocol stack of the source network device (or the information related to the source network device) until the first indication information used to instruct release of the source network device is received explicitly.

The first indication information used to instruct release of the source network device may be sent by the source network device to the terminal device (or may also be sent by the target network device to the terminal device).

The first indication information may be carried by at least one type of downlink information or channel. For example, it may be carried by Downlink Control Information (DCI), or carried by a Radio Resource Control (RRC) signaling, or carried by a Medium Access Control (MAC) Control Element (CE), or carried by a physical downlink shared channel (PDSCH), or carried by a physical downlink control channel (PDCCH), etc., which is not exhaustive here.

In addition, in this example, the method may further include that the terminal device reports to the target network device that the RLF occurs in connection with the source network device.

For example, in the process of performing operation 51, in a case that the terminal device determines that the RLF occurs between the terminal device and the source network device, the terminal device reports to the target network device that the RLF occurs in the connection with the source network device.

Alternatively, in the process of performing operation 52 or operation 53, for example, before (or after) receiving the first indication information, the terminal device reports to the target network device that the RLF occurs in the connection with the source network device.

In this example, the trigger condition of RLF includes at least one of:

expiry of a timer started after indication of radio link problems from a physical layer (if radio link problems are recovered before the timer is expired, the UE stops the timer); for example, in one case, the timer is started in a case of occurring out-of-synchronization, and when the timer expires, the out-of-synchronization problem is not resolved, then it is considered that the RLF occurs;

random access procedure failure with the source network device, for example, it may be the failure occurring in the process of triggering random access in a case of uplink out-of-synchronization, or, it may be the failure occurring in the process of triggering random access in a case of beam failure recovery (BFR), and other like, and they are considered that the RLF occurs; or a Radio Link Control (RLC) failure.

A Second Example

The preset condition includes that a condition for triggering random access is met between the terminal device and the source network device.

In a case that the preset condition is met, a process performed by the terminal device is: releasing the connection with the source network device; or not triggering the random access procedure with the source network device.

In this example, the condition for triggering random access includes at least one of: uplink out-of-synchronization; random access triggered by scheduling request (SR); beam failure recovery (BFR); or re-establishment of connection.

Since the scenario for the embodiment is that a random access between the terminal device and a target network device is successful in the process that the terminal device performs the first type of handover (DAPS handover), while the terminal device hands over the uplink data transmission to the target network device, the terminal device also retains the protocol stack of the source network device, or it is understood that the terminal device retains a connection with the source network device. Therefore, in this example, the random access procedure described refers to the random access procedure when the terminal device is in a connection state (with the source network device).

This example may further include that the terminal device report is a process situation of the terminal device to the target network device.

Specifically, if the terminal device releases the connection with the source network device in a case that the preset condition is met, the process situation of the terminal device may be reported to the target network device.

Alternatively, if the terminal device does not trigger the random access procedure with the source network device in a case that the preset condition is met, the process situation of the terminal device may be reported to the target network device.

The process situation of the terminal device at least includes: a cause of the terminal device triggering the random access procedure.

The cause for triggering the random access procedure may correspond to the condition for triggering random access. For example, if the condition for triggering random access is re-establishment connection, then in a case that the terminal device determines not to trigger the random access process with the source network device, the terminal device may send second indication information to the target network device to indicate a random access process between the terminal device and the source network device triggered by the re-establishment of connection.

Still further, the cause for triggering the random access procedure may be a reason value, for example, the reason value A, which may correspond to the uplink out-of-synchronization, etc., which is not exhaustive here.

In addition, the above process situation of the terminal device, in addition to the above cause of triggering the random access procedure, may also include a process manner of the terminal in a case that the condition for triggering the random access procedure is met. For example, its own process manner indicated by the terminal device to the target network device includes: not triggering the random access procedure with the source network device, or releasing the connection with the source network device, and the like.

In one manner, in the case of not triggering the random access procedure with the source network device, part of the processes in above examples may also be combined. For example, the terminal device may receive the first indication information. The first indication information is used to instruct release of the connection with the source network device. The terminal device releases the connection with the source network device based on the first indication information.

It can be seen that by adopting the above solutions, after a random access between the terminal device and a target network device is successful in a process that the terminal device performs a first type of handover, in a case that the preset condition is met, the terminal device releases the connection with the source network device, or does not trigger a re-establishment of a connection with the source network device, or does not trigger a random access procedure with the source network device. In this way, it can be ensured that, in a process that the terminal device performs a first type of handover, after a random access between the terminal device and a target network device is successful and terminal device establishes a connection with the target network device, no useless connection is triggered between the terminal device and the source network device, and thus no additional interruption time and additional processing complexity are brought to the terminal device.

Figure 6:
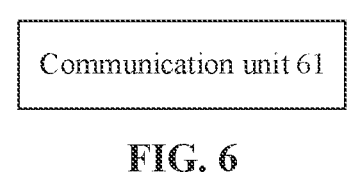

The embodiments of the present disclosure provide a terminal device. As shown in FIG. 6, the terminal device includes a communication unit 61.

The communication unit 61 is configured to: in a process that the terminal device performs a first type of handover, in response to that a random access between the terminal device and a target network device is successful, hand over uplink data transmission to the target network device and perform one of following processes in a case that a preset condition is met: releasing a connection with a source network device; not triggering a re-establishment of a connection with the source network device; or not triggering a random access procedure with the source network device.

The first type of handover is: a handover during which the terminal device maintains a protocol stack of the source network device and a protocol stack of the target network device. The first type of handover may be referred to as a dual active protocol stack (DAPS) handover (HO).

In the embodiments, a network device may be a base station on a network side. The source network device may be a source base station connected to the terminal device, and the target network device may be a target base station. The terminal device is a device that can maintain the connections with both the source network device and the target network device during handover.

The solution provided by the embodiments is as follows. In the process that the terminal device performs the first type of handover (DAPS handover), in a case that the random access between the terminal device and the target network device is successful, while the terminal device hands over the uplink data transmission to the target network device, the terminal device also retains the protocol stack of the source network device, or it is understood as that the terminal device retains the connection with the source network device. In such a scenario, how to avoid triggering a useless connection procedure and avoid additional transmission interruption time and additional complexity brought by the useless connection procedure to the terminal device is the problem to be solved by the solution provided in the embodiments.

Based on the above, the solution is illustrated with examples.

A First Example

The preset condition includes that a Radio Link Failure (RLF) occurs in a connection between the terminal device and the source network device.

The communication unit 61 is configured to: in a case that the preset condition is met, perform a process including releasing the connection with the source network device; or not triggering the re-establishment of the connection with the source network device.

For One Case:

In a case that a RLF occurs in a connection between the communication unit 61 of the terminal device and the source network device (or the source cell), the communication unit 61 releases the connection with the source cell.

The process of releasing the connection with the source network device may include: releasing a protocol stack of the source network device and releasing a secret key associated with the source network device.

For Another Case:

In the case that the RLF occurs in the connection between the communication unit 61 and the source network device, the re-establishment of the connection with the source network device is not triggered.

This operation may further include: if the process performed by the terminal device is not triggering the re-establishment of the connection with the source network device, the communication unit 61 of the terminal device retains the protocol stack of the source network device. The difference from the previous example is that in this case of this example, the terminal device is only controlled not to perform the re-establishment of the connection, but retains the protocol stack of the source network device, or it is understood as that the terminal device retains information related to the source network device.

On this basis, the communication unit 61 of the terminal device receives first indication information, the first indication information is used to instruct release of the connection with the source network device. The terminal device releases the connection with the source network device based on the first indication information. The process of releasing the connection with the source network device includes: releasing the protocol stack of the source network device and releasing a secret key associated with the source network device.

In addition, in this example, the communication unit 61 is further configured to report to the target network device that the RLF occurs in connection with the source network device.

In this example, the trigger condition for RLF includes at least one of:

expiry of a timer started after indication of radio link problems from a physical layer (if radio link problems are recovered before the timer is expired, the UE stops the timer): for example, in one case, the timer is started in a case of occurring out-of-synchronization, and when the timer expires, the out-of-synchronization problem is not resolved, then it is considered that the RLF occurs;

random access procedure failure with the source network device, for example, it may be the failure occurring in the process of triggering random access in a case of uplink out-of-synchronization, or, it may be the failure occurring in the process of triggering random access in a case of beam failure recovery (BFR), and other like, and they are considered that the RLF occurs: or a Radio Link Control (RLC) failure.

A Second Example

The preset condition includes that a condition for triggering random access is met between the terminal device and the source network device.

In a case that the preset condition is met, a process performed by the communication unit 61 of the terminal device is: releasing the connection with the source network device; or not triggering the random access procedure with the source network device.

In this example, the condition for triggering random access includes at least one of: uplink out-of-synchronization: random access triggered by scheduling request (SR); beam failure recovery (BFR); or re-establishment of connection.

This example may further include that the communication unit 61 of the terminal device is configured to report a process situation of the terminal device to the target network device.

The process situation of the terminal device at least includes: a cause of the terminal device triggering the random access procedure.

It can be seen that by adopting the above solutions, after a random access between the terminal device and a target network device is successful in a process that the terminal device performs a first type of handover, in a case that the preset condition is met, the terminal device releases the connection with the source network device, or does not trigger a re-establishment of a connection with the source network device, or does not trigger a random access procedure with the source network device. In this way, it can be ensured that, in a process that the terminal device performs a first type of handover, after a random access between the terminal device and a target network device is successful and terminal device establishes a connection with the target network device, no useless connection is triggered between the terminal device and the source network device, and thus no additional interruption time and additional processing complexity are brought to the terminal device.

Figure 7:
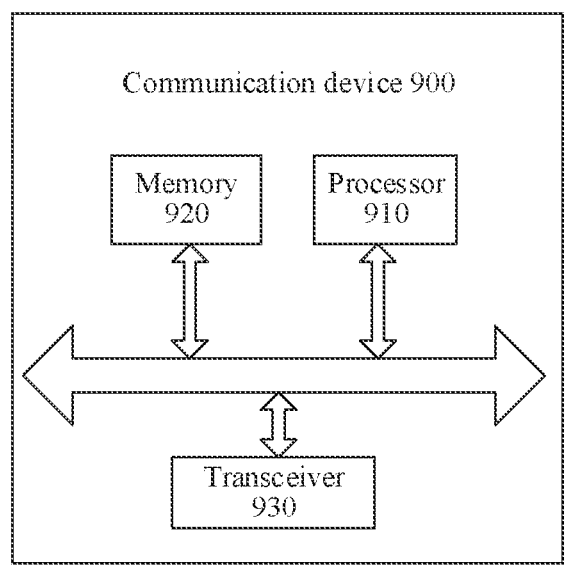
FIG. 7 is a schematic structural diagram of a communication device provided by the embodiments of the present disclosure.

FIG. 7 is a schematic structural diagram of a communication device 900 provided by the embodiments of the present disclosure. The communication device in the embodiments may be specifically the network device in the above embodiments. The communication device 900 shown in FIG. 7 includes a processor 910, and the processor 910 may call and run computer programs from a memory to implement the methods in the embodiments of the present disclosure.

Alternatively, as shown in FIG. 7, the communication device 900 may further include a memory 920. The processor 910 may call and run the computer programs from the memory 920 to implement the methods in the embodiments of the present disclosure.

The memory 920 may be a separate device independent of the processor 910, or may be integrated in the processor 910.

Alternatively, as shown in FIG. 7, the communication device 900 may further include a transceiver 930, and the processor 910 may control the transceiver 930 to communicate with other devices, specifically, may send information or data to other devices, or receive information or data sent by other devices.

The transceiver 930 may include a transmitter and a receiver. The transceiver 930 may further include antennas, and the number of the antennas may be one or more.

Alternatively, the communication device 900 may specifically be a terminal device or a network device in the embodiments of the present disclosure, and the communication device 900 may implement the corresponding processes implemented by the mobile terminal/terminal device in various methods in the embodiments of the present disclosure. For the sake of brevity, elaborations are omitted herein.

Figure 8:
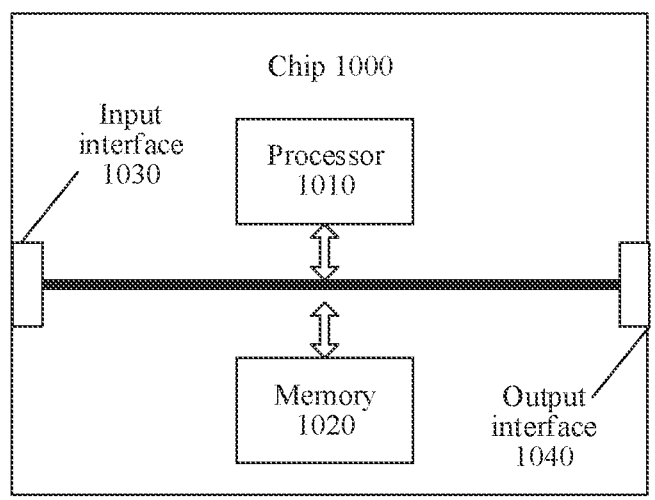
FIG. 8 is a schematic block diagram of a chip provided by the embodiments of the present disclosure.

FIG. 8 is a schematic structural diagram of a chip according to the embodiments of the present disclosure. The chip 1000 shown in FIG. 8 includes a processor 1010, and the processor 1010 may call and run computer programs from a memory to implement the methods in the embodiments of the present disclosure.

Alternatively, as shown in FIG. 8, the chip 1000 may further include a memory 1020. The processor 1010 may call and run computer programs from the memory 1020 to implement the methods in the embodiments of the present disclosure.

The memory 1020 may be a separate device independent of the processor 1010, or may be integrated in the processor 1010.

Alternatively, the chip 1000 may further include an input interface 1030. The processor 1010 may control the input interface 1030 to communicate with other devices or chips, and specifically, may obtain information or data sent by other devices or chips.

Alternatively, the chip 1000 may further include an output interface 1040. The processor 1010 may control the output interface 1040 to communicate with other devices or chips, and specifically, may output information or data to other devices or chips.

Alternatively, the chip may be applied to the corresponding processes implemented by the terminal device in various methods in the embodiments of the present disclosure. For the sake of brevity, elaborations are omitted herein.

It should be understood that the chip mentioned in the embodiments of the present disclosure may also be referred to as a system level chip, a system chip, a chip system, or a system-on-chip, or the like.

It should be understood that the processor in the embodiments of the present disclosure may be an integrated circuit chip, which has the capability of processing signals. In the implementation process, various operations of the above method embodiments may be completed by a hardware integrated logic circuit in a processor or an instruction in the form of software. The above processor may be a general-purpose processor, a Digital Signal Processor (DSP), an Application Specific Integrated Circuit (ASIC), a Field Programmable Gate Array (FPGA) or other programming logic devices, discrete gate or transistor logic devices, discrete hardware components. Various methods, operations, and logical block diagrams disclosed in the embodiments of the present disclosure may be implemented or executed. A general-purpose processor may be a microprocessor or the processor may be any conventional processor or the like. The operations of the method disclosed in conjunction with the embodiments of the present disclosure may be directly embodied as executed by a hardware decoding processor, or executed by a combination of hardware and software modules in the decoding processor. The software modules may be located in random access memory, flash memory, read-only memory, programmable read-only memory or electrically erasable programmable memory, registers and other mature storage media in the art. The storage medium is located in the memory, and the processor reads the information in the memory, and completes the operations of the above method in combination with its hardware.

It should be understood that the memory in the embodiments of the present disclosure may be a volatile memory or a non-volatile memory, or may include both volatile and non-volatile memory. The non-volatile memory may be Read-Only Memory (ROM), Programmable ROM (PROM), Erasable PROM (EPROM), Electrically EPROM (EEPROM) or flash memory. Volatile memory may be Random Access Memory (RAM), which acts as an external cache. By way of example and not limitation, many forms of RAM are available, such as Static RAM (RAM), Dynamic RAM (DRAM), Synchronous DRAM (SDRAM), Double Data Rate SDRAM (DDR SDRAM), Enhanced SDRAM (ESDRAM), Synchlink DRAM (SLDRAM) and Direct Rambus RAM (DR RAM). It should be noted that the memory of the systems and methods described herein is intended to include, but not be limited to, these and any other suitable types of memory.

It should be understood that the above memory is an exemplary but non-limiting description. For example, the memory in the embodiments of the present disclosure may also be a static RAM (SRAM), a dynamic RAM (DRAM), synchronous DRAM (SDRAM), double data rate SDRAM (DDR SDRAM), enhanced SDRAM (ESDRAM), synch link DRAM (SLDRAM) and Direct Rambus RAM (DR RAM) and so on. That is, memory in embodiments of the present disclosure is intended to include, but not be limited to, these and any other suitable types of memory.

Figure 9:
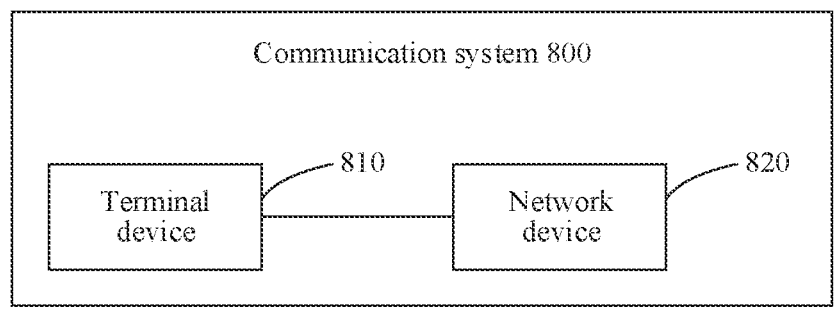
FIG. 9 is a second schematic diagram of a communication system architecture provided by the embodiments of the present disclosure.

FIG. 9 is a schematic block diagram of a communication system 800 provided by the embodiments of the present disclosure. As shown in FIG. 9, the communication system 800 includes a terminal device 810 and a network device 820. Here, the network device may include the source network device or the target network device.

The terminal device 810 may be used to implement the corresponding functions implemented by the UE in the above methods, and the network device 820 may be used to implement the above method on the source network device side or corresponding functions implemented by the network device in the method on the target network device side. For the sake of brevity, elaborations are omitted herein.

Embodiments of the present disclosure further provide a computer-readable storage medium for storing a computer program.

Alternatively, the computer-readable storage medium may be applied to a network device or a terminal device in the embodiments of the present disclosure, and the computer program causes the computer to execute the corresponding processes implemented by the network device in various methods of the embodiments of the present disclosure. For the sake of brevity, elaborations are omitted herein.

Embodiments of the present disclosure also provide a computer program product, including computer program instructions.

Alternatively, the computer program product may be applied to a network device or a terminal device in the embodiments of the present invention, and the computer program instructions cause the computer to execute the corresponding processes implemented by the network device in various methods of the embodiments of the present disclosure. For the sake of brevity, elaborations are omitted herein.

The embodiments of the present disclosure also provide a computer program.

Alternatively, the computer program may be applied to a network device or a terminal device in the embodiments of the present disclosure, and when the computer program runs on a computer, the computer executes the corresponding processes implemented by the network device in various methods of the embodiments of the present disclosure. For the sake of brevity, elaborations are omitted herein.

By adopting the above solution, after a random access between the terminal device and a target network device is successful in a process that the terminal device performs a first type of handover, in a case that the preset condition is met, the terminal device releases the connection with the source network device, or does not trigger a re-establishment of a connection with the source network device, or does not trigger a random access procedure with the source network device. In this way, it can be ensured that, in a process that the terminal device performs a first type of handover, after a random access between the terminal device and a target network device is successful and terminal device establishes a connection with the target network device, no useless connection is triggered between the terminal device and the source network device, and thus no additional interruption time and additional processing complexity are brought to the terminal device.

Those skilled in the art can realize that the units and algorithm operations of various examples described in conjunction with the embodiments of the present disclosure can be implemented in electronic hardware, or a combination of computer software and electronic hardware. Whether these functions are performed in hardware or software depends on the specific application and design constraints of the technical solution. Skilled artisans may implement the described functionality using different methods for each particular application, but such implementations should not be considered beyond the scope of the present disclosure.

Those skilled in the art can clearly understand that, for the convenience and brevity of description, the specific operating processes of the above systems, devices and units may refer to the corresponding processes in the above method embodiments. Elaborations are omitted herein.

In the several embodiments provided by the present disclosure, it should be understood that the disclosed systems, devices and methods may be implemented in other manners. For example, the apparatus embodiments described above are only illustrative. For example, the division of the units is only a logical function division. In actual implementation, there may be other division methods. For example, multiple units or components may be combined or be integrated into another system, or some features may be ignored, or not performed. On the other hand, the shown or discussed mutual coupling or direct coupling or communication connection may be the communication connection or indirect coupling through some interfaces, devices or units, and may be in electrical, mechanical or other forms.

The units described as separate components may or may not be physically separated, and components illustrated as units may or may not be physical units, that is, may be located in one place, or may be distributed to multiple network units. Some or all of the units may be selected according to actual needs to implement the purpose of the solutions in the embodiments.

In addition, various functional units in various embodiments of the present disclosure may be integrated into one processing unit, or each unit may exist physically alone, or two or more units may be integrated into one unit.

The functions, if implemented in the form of software functional units and sold or used as independent products, may be stored in a computer-readable storage medium. Based on this understanding, the essence of the technical solution of the present disclosure or the part that contributes to the prior art or the part of the technical solution may be embodied in the form of a software product. The computer software product is stored in a storage medium, includes several instructions to cause a computer device (which may be a personal computer, a server, or a network device, etc.) to execute all or part of the operations of the methods described in the various embodiments of the present disclosure. The above storage medium includes: U disk, mobile hard disk, Read-Only Memory (ROM), Random Access Memory (RAM), magnetic disk or optical disk and other media that can store program codes.

The above are only specific embodiments of the present disclosure, but the protection scope of the present disclosure is not limited thereto. Any person skilled in the art can easily think of changes or substitutions within the technical scope disclosed in the present disclosure, which should be covered within the protection scope of the present disclosure. Therefore, the scope of protection of the present disclosure should be subject to the scope of protection of the claim.

The invention claimed is:

1. A method for processing handover, comprising:
in a process that a terminal device performs a Dual Active Protocol Stack (DAPS) handover,
handing over, by the terminal device, uplink data transmission to a target network device based on a random access between the terminal device and the target network device being successful;
performing, by the terminal device, following processes in a case that a preset condition comprising a Radio Link Failure (RLF) occurring in a connection between the terminal device and a source network device is met:
retaining related configuration information of the source network device without triggering a re-establishment of the connection with the source network device; and
receiving, by the terminal device, first indication information, and releasing a protocol stack of the source network device and a secret key associated with the source network device based on the first indication information.

2. The method of claim 1, wherein a triggering condition of the RLF comprises at least one of:
expiry of a timer started after an indication of radio link problems from a physical layer;
a random access procedure failure with the source network device; or
a Radio Link Control (RLC) failure.

3. The method of claim 1, wherein the DAPS handover is a handover during which the terminal device maintains the protocol stack of the source network device and a protocol stack of the target network device.

4. A terminal device, comprising:
a processor; and
a memory for storing computer programs executable on the processor,
wherein the processor is configured to execute the computer programs to perform following operations: in a process that the terminal device performs a Dual Active Protocol Stack (DAPS) handover,
handing over uplink data transmission to a target network device based on a random access between the terminal device and the target network device being successful;
performing following processes in a case that a preset condition comprising a Radio Link Failure (RLF) occurring in a connection between the terminal device and a source network device is met:
retaining related configuration information of the source network device without triggering a re-establishment of the connection with the source network device; and
receiving first indication information, and releasing a protocol stack of the source network device and a secret key associated with the source network device based on the first indication information.

5. The terminal device of claim 4, wherein a triggering condition of the RLF comprises at least one of:
expiry of a timer started after an indication of radio link problems from a physical layer;
a random access procedure failure with the source network device; or
a failure of a Radio Link Control (RLC).

6. The terminal device of claim 4, wherein the DAPS handover is: a handover during which the terminal device maintains the protocol stack of the source network device and a protocol stack of the target network device.

7. A non-transitory computer-readable storage medium for storing computer programs, wherein the computer programs, when executed by a processor of a terminal device, cause the terminal device to perform following operations:
in a process that the terminal device performs a Dual Active Protocol Stack (DAPS) handover,
handing over uplink data transmission to a target network device based on a random access between the terminal device and the target network device being successful;
performing following processes in a case that a preset condition comprising a Radio Link Failure (RLF) occurring in a connection between the terminal device and a source network device is met:
retaining related configuration information of the source network device without triggering a re-establishment of the connection with the source network device; and
receiving first indication information, and releasing a protocol stack of the source network device and a secret key associated with the source network device based on the first indication information.

8. The non-transitory computer-readable storage medium of claim 7, wherein the DAPS handover is: a handover during which the terminal device maintains the protocol stack of the source network device and a protocol stack of the target network device.

9. The method of claim 1, wherein the first indication information is received by the terminal device from the source network device.

10. The method of claim 1, further comprising:
reporting, by the terminal device, to the target network device that the RLF occurs in the connection with the source network device.

11. The terminal device of claim 4, wherein the first indication information is received by the terminal device from the source network device.

12. The terminal device of claim 4, wherein the processor is further configured to report to the target network device that the RLF occurs in the connection with the source network device.

13. The terminal device of claim 4, wherein the first indication information is carried by Downlink Control Information (DCI).

14. The terminal device of claim 4, wherein the first indication information is carried by a Medium Access Control (MAC) Control Element (CE).

15. The terminal device of claim 4, wherein the first indication information is carried by a physical downlink shared channel (PDSCH).

16. The terminal device of claim 4, wherein the first indication information is carried by a physical downlink control channel (PDCCH).

17. The non-transitory computer-readable storage medium of claim 7, wherein the first indication information is received by the terminal device from the source network device.

18. The non-transitory computer-readable storage medium of claim 7, wherein the computer programs further cause the terminal device to report to the target network device that the RLF occurs in the connection with the source network device.

* * * * *